United States Patent [19]

Elsenbaumer et al.

[11] Patent Number: 4,661,383

[45] Date of Patent: Apr. 28, 1987

[54] METHOD FOR GRAFTING POLYMERS TO POLYTETRAFLUOROETHYLENE, AND GRAFTED COMPOSITES THEREOF

[75] Inventors: Ronald L. Elsenbaumer, Morristown; Dawn M. Ivory, Stanhope; Zafar Iqbal; R. Henry Baughman, both of Morristown, all of N.J.

[73] Assignee: Allied Corporation, Morris Township, Morris County, N.J.

[21] Appl. No.: 859,546

[22] Filed: May 4, 1986

[51] Int. Cl.[4] .................. B05D 3/10; C08F 259/08; C08J 7/12; C08J 7/16
[52] U.S. Cl. .................. 427/302; 427/400; 428/336; 428/337; 428/338; 428/422; 525/326.2; 525/275; 525/276; 525/385
[58] Field of Search .................. 525/326.2, 275, 276; 427/307, 302; 428/422

[56] References Cited

U.S. PATENT DOCUMENTS

| | | | |
|---|---|---|---|
| 4,565,650 | 1/1986 | Francois et al. | 525/275 |
| 4,596,855 | 6/1986 | Stewart | 525/326.2 |
| 4,605,685 | 8/1986 | Momose et al. | 525/326.2 |

FOREIGN PATENT DOCUMENTS 60-020940A  2/1985  Japan .................. 525/276

OTHER PUBLICATIONS

Costello and McCarthy, "Electronic Conductivity . . .", Macromolecules, 18, pp. 2087–2088 (1985).
Cervinka, et al., "Study and Analysis of Structural . . .", Philosophical Magazine B, 51, No. 6, pp. 603–633 (1985).
Sobue, et al., "Radiation Induced Graft . . .", Chemical Abstracts, 76 (1971) 113814f.
Kabanov, et al., "Radiation Ionic Graft . . .", Chemical Abstracts, (1971) 89044m.
Patton and McCarthy, "Surface Modification of Poly . . .", Macromolecules, 17, pp. 2940–2942 (1984).

Primary Examiner—Carman J. Seccuro
Attorney, Agent, or Firm—Gale F. Matthews; Richard C. Stewart; Gerhard H. Fuchs

[57] ABSTRACT

A novel method for grafting polymers to polytetrafluoroethylene (PTFE) and composites grafted according to this method are described. PTFE at a surface of a substrate is reduced to polyacetylene (PA) and then doped with a suitable dopant. The doped PA/PTFE substrate is then contacted with a polymerizable monomer precursor capable of polymerizing with doped PA, to form the polymer of said precursor chemically bonded to the surface of the PA/PTFE substrate. A grafted composite with layers of varying thickness may be formed by further contacting the substrate bonded to polymer with preformed polymer of a similar cohesive energy density.

16 Claims, 1 Drawing Figure

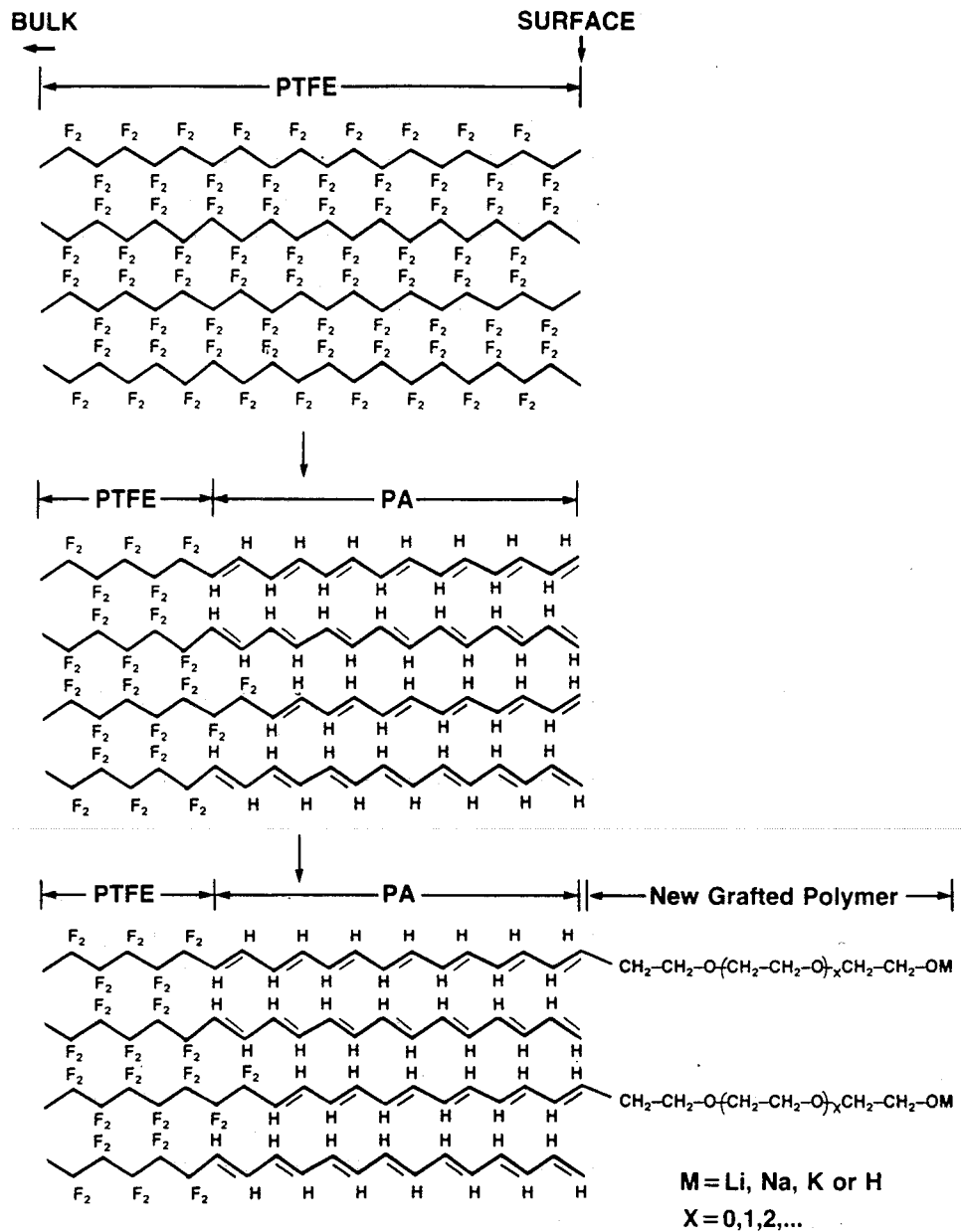

4,661,383

METHOD FOR GRAFTING POLYMERS TO POLYTETRAFLUOROETHYLENE, AND GRAFTED COMPOSITES THEREOF

This invention relates to a novel method of grafting polymers to polytetrafluoroethylene by modifying a polytetrafluoroethylene-containing surface to form polyacetylene as a chemically bonded surface layer onto which other polymers are then grafted.

BACKGROUND OF THE INVENTION

Modification of polymer surfaces has often been employed for cleaning purposes, to induce crosslinking, to increase wettability, to prepare the surface for adhesion, and so on. The surface properties of the polymer are effected depending upon the combination of the polymeric chemical structure and method of surface modification utilized.

Polytetrafluoroethylene (PTFE) as a material is favored for many uses because it is relatively inert and has low adhesion and low friction properties. However, these very same properties create problems when it is desired to bond this polymer to diverse surfaces, making it necessary to first modify the PTFE surface. This has been accomplished in the past by transforming the surface into an air stable amorphous phase of carbon by reduction with amalgams of alkali metals such as lithium.

L. Cervinka et al., in "Study and Analysis of Structural Properties of Non-crystalline Carbon Phase Prepared from PTFE", *Philosophical Magazine B*, Vol. 51 No. 6, 603–633 (1985), proposed a model structure of such a modification resulting in amorphous carbon that consists of graphite-like regions with a relatively well-ordered layer of graphitic carbon, separated by small, dispersed diamond-like carbon regions. Modification of the PTFE in this manner affords adhesion via Van der Waals forces to certain other conventional polymers.

Other surface modifications of PTFE known to the art include treatments with alkali metals, solutions of alkali metal-naphthalides, and liquid sodium-ammonia treatments, as well as direct electrochemical reduction. These treatments prepare the surface for improved adhesion to other materials via the formation of air stable carbonaceous surface layers composed largely of graphitic and amorphous carbon.

Solbue et al., *Chemical Abstracts* 76 (20):113814f, 1971, report a graft copolymerization of styrene onto Teflon ® (PTFE) using gamma radiation. This grafting might possibly be attributed to x-ray generation of free radicals on the PTFE surface which initiate polymerization of styrene. The investigators found the thermal behavior of styrene-grafted Teflon ® (PTFE) to be similiar to that of a polystyrene-Teflon ® (PTFE) blend, however, workability of PTFE was not improved.

Reduction of PTFE surfaces has also been effected through the use of a dianion of benzoin (benzil dianion) in a suitable solvent yielding a gold-colored, air-sensitive surface film. This is in contrast to the air stable, black carbonaceous surfaces produced by the chemical methods described above. Costello and McCarthy, *Macromolecules*, vol. 18, (Dec. 1985) pp. 2087–88, report the above reaction as converting the surface of PTFE to a metallic gold-colored, air-sensitive, nearly totally carbonaceous material. No uses were reported for this material, however, they explored the electrical conductivity of the modified surface and found it to be low until acceptor-doped with iodine.

SUMMARY OF THE INVENTION

The present invention provides a novel method for grafting polymers to a substrate containing polytetrafluoroethylene, which method comprises the steps of:

a. reducing a surface of the substrate polytetrafluoroethylene to polyacetylene, b. doping said polyacetylene with a suitable dopant, and c. contacting said doped surface layer polyacetylene with a polymerizable monomer precursor capable of polymerizing with said polyacetylene, for a time sufficient to form a first polymer of said monomer covalently bonded to the surface of said substrate.

The present invention also relates to a substrate prepared in accordance with the process of the invention having a polymer covalently bonded to one or more surfaces thereof, forming a composite.

As used herein, the term "polytetrafluorethylene" refers to a homopolymer of polytetrafluoroethylene, or a copolymer of polytetrafluoroethylene and one or more monomers copolymerizable therewith. The term "composite," means an article comprised of distinct polymeric parts, one of which contains PTFE, wherein at least some portion of the material or materials is chemically bonded to the PTFE.

BRIEF DESCRIPTION OF THE DRAWING

The FIGURE schematically portrays a preferred embodiment of the process and products in the preparation of a reduced PTFE surface and grafting to a conventional polymer.

DETAILED DESCRIPTION OF THE PRESENT INVENTION

In the first step of the method of the present invention, all or part of a surface of a substrate containing polytetrafluoroethylene (PTFE) is reduced to polyacetylene (PA) which is chemically bonded to the PTFE. Procedures for carrying out the reduction may vary widely. Illustrative of such procedures are those that employ chemical or electrochemical means.

For example, chemical reduction may be accomplished by contacting the surface containing PTFE with a "suitable reducing agent" in the presence of a "suitable solvent".

As used herein, a "suitable reducing agent" useful in the practice of the present invention is one that will reduce the PTFE contained in the surface of the substrate to eliminate the fluorine atoms to any extent.

Illustrative of reducing agents useful in the practice of the present invention are the alkali metals Li, Na, K, Rb, Cs; solutions of alkali metal-naphthalides, anthracides or benzophenone ketyls; metal ammonia solutions of Li, Na, K, Rb, Cs; and alkali-metal benzoin dianions, such as the dilithium, disodium, dipotassium, and dicesium salts of benzoin dianion.

In the preferred embodiments of the invention, reducing agents are those which will effectively donate electrons to PTFE at a chemical potential more positive than the reduction potential of lithium metal. More preferably, the reductive power of suitable reducing agents will fall between that of Li metal and Mg metal, which, electrochemically corresponds to reductive voltages between about 0.0 V to about 1.8 V vs. lithium metal (Li/Li+). A most preferred voltage range is between about 0.5 V to about 1.5 V.

Illustrative of the most preferred reducing agents capable of donating electrons to PTFE at an electrical potential more positive than lithium metal are agents of benzoin dianion. The alkali metal agents of benzoin dianion may be prepared in situ from a strong organic base and benzoin in a suitable solvent as defined below. Strong organic bases particularly useful to effect this preparation are hydroxides such as LiOH, NaOH, KOH and the like; and alkoxides, such as the methoxides, ethoxides, isopropoxides and tert-butoxides, of $Li^+$, $Na^+$, and $K^+$ and the like. Potassium tert-butoxide is preferred.

As used herein, a "suitable solvent" is a solvent which is proton donating under the reaction conditions used. Illustrative of these suitable solvents are sulfoxides, such as dimethylsulfoxide, tetrahydrothiophene oxide, and diethylsulfoxide; sulfones such as sulfolane, and dimethylsulfone; amides such as N-methylpyrrolidinone; and nitriles, such as acetonitrile. Preferred are those solvents having a $pK_a$ value under process conditions of between about 25 and 32, and most preferred between about 28 and 32. Of the solvents that fall into these preferred classes and are particularly useful may be mentioned dimethylsulfoxide, dimethysulfone, N-methylpyrrolidinone, acetonitrile, N,N-dimethylacetamide, among others. Dimethylsulfoxide is the solvent of choice in some embodiments of the invention.

Electrochemical reduction may be effected by means generally known to the art. Allen J. Bard and Larry R. Faulknor in, "Electrochemical Methods, Fundamentals and Applications", John Wiley and Sons, New York, N.Y., 1980, Chapter 10, p. 370, provide helpful descriptions on carrying out these methods.

It is preferred to utilize a reduction potential which is above that of lithium metal, Li/Li+ taken as 0.0 V for reference. More preferred is a range between about 0.0 V to 2.0 V. Most preferred is a range between about 0.5 V positive to 1.5 V positive of lithium metal potential.

The electrochemical reduction is ordinarily conducted in the presence of a suitable solvent (as discussed above), which effectively insures the transfer of protons, and an appropriate electrolyte salt which is stable at the potentials employed for reduction.

In some embodiments of the present invention, the electrode serves as a template wherein the conductive region on the template forms a design. The PTFE substrate is then contacted with the electrode converting only the "design area" to PA. Polymer may then be grafted to the PA converted "design area".

The substrate useful in the practice of this invention is not critical and can vary widely, the only requirement being that the surface of the substrate contain sufficient PTFE to yield the desired amount of polyacetylene on or in its surface after reduction. For example, the substrate or its surface may be composed entirely of PTFE. In addition, the PTFE substrate may be physically combined as a mixture, or composite, or the like, with various other materials such as metals, plastics and so on to form the substrate, depending upon the desired applications. For example, the substrates may consist of mixtures of PTFE and fillers such as mica, aluminum, lead and the like, or may consist of mixtures of PTFE and other compatible polymers which can be combined with PTFE to form mixtures, as for example, poly(chlorotrifluoroethylene), poly(fluoroisobutylene) and the like. Such combinations are limited only in that a sufficient amount of PTFE must be available on the surface of the substrate for reduction to polyacetylene, as described above.

Also within the contemplation of the present invention are substrates composed of one or more copolyers formed from PTFE and one or more "copolymerizable monomers". By "copolymerizable" is meant that the monomer is able to copolymerize with PTFE to form an integral part of the main copolymer chain. It is preferable in these situations that the PTFE portion be composed of at least ten tetrafluoroethylene units or longer to achieve PA chains of about ten conjugated ethylene units or greater upon reduction. It is more preferred that the PTFE portion be comprised of at least 20 tetrafluoroethylene units, and most preferred at least 50 tetrafluoroethylene units.

Polymers or polymer precursors suitable for copolymerization with PTFE may be alkenes such as ethylene, acetylene, and styrene; dienes such as butadiene and the like, halogen substituted alkenes such as hexafluoropropylene, difluoroethylene, chlorotrifluoroethylene, fluoroisobutylene, perfluorobutene-1, perfluoropentene-1, perfluoro-1-heptene, hydroperfluoro1-octene, and perfluorobutyl ethylene, and the fluorinated vinyl ethers represented by the formula $XCF_2(CF_2)_nOCF=CF_2$ wherein X is F, H or Cl and n is an integer of 1 to 7. Examples of such vinyl ethers include perfluoro(ethyl vinyl ether), perfluoro(propyl vinyl ether), 3-hydroperfluoro(propyl vinyl ether), and perfluoro(2-methylene-4-methyl-1,3-dioxane), and the like.

Any other polymer or polymer precursor that is copolymerizable with PTFE may be utilized to form the substrate. Illustrative of such substances are copolymers such as ethylene copolymers with tetrafluoroethylene, copolymers of tetrafluoroethylene and chlorotrifluoroethylene, copolymers of tetrafluoroethylene and perfluoropropylene, to name a few.

When a substrate composed of one or more copolymers is used, the PTFE segments must again be present in an amount sufficient to yield, upon reduction, a sufficient amount of polyacetylene on and in its surface to enable adequate bonding properties. Generally speaking, it is preferred that the amount of PTFE in the copolymer is about 20 mole % or greater, particularly preferred is an amount of 40% or greater, and most preferred is 80% or greater.

Reduction of a substrate surface composed of a mixture of PTFE with other polymers, or a copolymer of PTFE and one or more other polymers, will usually result in a non-homogenous, non-continuous distribution of polyacetylene on and in the surface. Scanning electron microscopy, resonance Raman, and photoacoustic FT-IR spectral analyses can be utilized to determine the extent of the polyacetylene transformation on the surface of PTFE-containing articles.

Generally, the non-polyacetylenic areas are not "graftable" to other polymers by the methods outlined in the present invention. In sole embodiments of the invention, it is desirable to achieve a somewhat homogeneous surface layer of polyacetylene to insure that a substantial amount is available for graft polymerization of conventional polymers to the surface. Of course, if the substrate is a homopolymer of PTFE, one or more of its surfaces may be transformed entirely into a continuous surface layer of polyacetylene upon reduction according to the method as defined herein.

Reduction of PTFE according to the present method is unique in that it produces a covalently bonded surface layer of PA. This surface PA layer is donor and acceptor dopable and thus capable of covalently bonding to conventional monomers that will anionically or cationically polymerize in situ.

Hence, in preparation for grafting, the amount of PTFE contained in the substrate must be sufficient to yield, on reduction, a suitable amount of surface polyacetylene containing conjugation lengths of about 10 or greater carbon-carbon double bonds, dopable to levels of about 1 mole % based on the total number of carbon atoms (i.e. 1 mole % equals 1 dopant ion per 100 carbon atoms), or greater. The dopant level is preferably about 5–18 mole %. A preferred amount of polyacetylene would be an amount corresponding from about one to about ten molecular polyacetylene layers. The layers do not have to be completely uniform as long as enough polyacetylene is present to enable doping and initiation of graft polymerization of conventional polymers. The thickness of the layer of PA, or combination of PA and other substances, may be varied by altering the reaction times and temperatures as well as the amount of reductants used. Illustrative of suitable layer thickness for layers composed of PA, or mixtures including PA, are those that range from about 0.1 $\mu$m to 20 $\mu$m, more preferably from about 1–10 $\mu$m. It is particularly useful to have a PA layer ranging between about 1–5 $\mu$m of thickness, as this has been found to be dopable and to initiate covalent bonding to conventional polymers such as polystyrene and the like by graft polymerization.

The substrate-containing PTFE is subjected to reductive conditions in any suitable manner for the length of time necessary to effect the reduction of the PTFE to a desired extent. As discussed above, reaction times may vary widely, depending on a number of factors, including the size of the substrate, the extent of reduction desired, the depth of modification desired, and the temperature at which the reaction is carried out. For example, the higher the temperature, the shorter the reduction time period. Thus, the reduction time period may vary from minutes to days. Generally, time periods at room temperature range between about 2 hours and about 80 hours, more preferred being between about 5 to about 75 hours, to insure conversion of a few micrometers of the surface of a dense PTFE substrate. Reaction temperatures range from about 0° C. to about 100° C., preferred are temperatures between about 25° C. and about 80° C. Most preferred are temperatures between about 40° and about 60° C.

In the second step of the process of the invention, the modified PTFE-containing substrate is doped to prepare it for grafting.

Oxidative ("p-type") or reductive ("n-type") doping techniques may be employed. A number of such techniques, chemical or electrochemical, are known to the art and will not be set forth in detail here. For example, p- or n-doping techniques that may be useful are disclosed in A. G. MacDiarmid and A. J. Heeger, *Synthetic Metals*, 1, 101–118 (1980), and D. MacInnes, Jr., M. A. Druy, P. J. Nigrey, D. P. Nairns, A. G. MacDiarmid and A. J. Heeger, *J. Chem. Soc. Chemical Comm.*, 317 (1981). Preferred techniques for n-doping are disclosed in R. L. Elsenbaumer, et al., *Synthetic Metals*, 11, 251–270 (1985), wherein polyacetylene is exposed to a n-doping solution of sodium or potassium napthalide in dry tetrahydrofuran.

When chemical doping is employed, suitable p-dopants are those that are electron oxidants that oxidize the polymer backbone to provide a cation or cation radical on the polymer chain. Of these may be mentioned Lewis acid halides such as $AsF_5$, $SbF_5$, $PF_5$, $MoOCl_4$; and inorganic oxidants such as Fe(III) salts, such as $FeCl_3$, $Fe(ClO_4)_3$, $Fe(OSO_2CH_3)_3$, $Fe(OSO_2CF_3)_3$, and $Fe(OSO_2C_6H_6CH_3)_3$; $SO_3$, $I_2$, $Br_2$, $NO^+$, $NO_2^+$ and $Ag^+$ salts of $BF_4^-$, $PF_6^-$, $SbF_6^-$, $AsF_6^-$, $CF_3SO_3^-$, $CH_3SO_3^-$, $FsO_3^-$, peroxides such as $FSO_2OOSO_2F$, $CH_3SO_2OOSO_2CH_3$, and the like. Preferred among these are the $Fe^{III}$, $Ag^I$, $NO^+$, $NO_2^+$ salts and $SO_3$ due to ease of reaction and extent of doping readily achieved. Particularly preferred are $SO_3$, $NO^+$ and Fe(III) salts.

n-Doping is preferred. Suitable n-dopants are those that donate electrons to the conjugated backbone of the formed polyacetylene so as to provide a anion or radical anion capable of initiating graft anionic polymerization of monomers. Illustrative of these are alkali metals, alkali-metal complexes, and amalgams involving alkali metals, examples of which are Li, Na, K, Rb and Cs; and anthracides, naphthalides, and benzophenone ketyls of the above in solvents such as THF or diethylether. Combinations of the above reducing agents have also proven useful.

Also useful as dopants are alkyl lithium reagents such as n-butyllithium, t-butyllithium, methyllithium, phenyllithium and the like.

Preferred among the n-dopants are the alkyllithium reagents and the alkali-metal naphthalides. Of these preferred n-dopants, butyllithium, phenyllithium, and potassium naphthalide are particularly preferred, due to ease of reaction and extent of doping achieved.

In principle, only a very low doping level is necessary since each dopant ion initiates polymerization on that site. In practice, a preferred amount of doping is usually about 1 to about 18 mole percent (based on the total number of carbon atoms in the PA), with about 5% to 18% on the aforementioned basis more preferred.

Since the doped substrate is extremely water and air sensitive, it is preferred to carry out the doping reaction in an inert environment, such as that provided by a vacuum line or a dry box system. A good description of such a system is detailed in D. F. Shriver, "Manipulation of Air Sensitive Compounds", McGraw-Hill Book Company, N.Y., N.Y., 1969.

Doping will often change the glossy surface golden color indicative of PTFE reduced to PA in a substrate, to a blue-black color indicative of doped PA.

It is preferred to carry out the reductive step and the doping step consecutively. However, while not preferred, in some instances it may be desirable to simultaneously reduce the PTFE and dope the resulting PA. This is especially possible with donor dopants for PA which are also suitable reductants for PTFE in the presence of a proton donating solvent. Reducing agents/donor-dopants which are particularly useful in this regard are the alkali-metal naphthalides, anthracides, and benzophenone ketyls; and the alkali-metal salts of benzoin dianion. Preferred proton-donating solvents are diethylether, THF, or liquid ammonia. Simultaneously reducing PTFE to PA and then doping the resulting PA may provide a time saving technique for modification of PTFE-containing surfaces. In this embodiment, stoichiometric amounts of the reducing dopant and the proton donating solvent interact to reduce all or a portion of the PTFE on the surface of the substrate and in some instances on and below the surface to the desired extent. The amount of the reducing dopant in excess of this stoichiometric amount is then available to dope the formed PA. A key process condition when conducting these steps simultaneously is to perform the reaction in the presence of an amount of the reducing dopant in excess of the stoichiometric amount required to interact with proton-donating solvent present in the reaction mixture (from those described above) sufficient to provide the desired extent of PTFE to PA conversion on the surface of the PTFE-containing substrate. Suitable amounts of proton-donating solvent and reducing dopant could be readily determined by routine experimentation, limited only by the amount of PTFE it is desired to convert to PA and the amount of PA desired to dope. One would determine how much PA is desired, and then, taking into account the dimensions of the article whose surface is to be converted, calculate how many moles of proton-donating solvent would be needed to reduce the amount of PTFE present. Based on the stoichiometry of the reaction, the desired amount of doping, the amount of reducing dopant can be elected. As the proton-donating solvent and a portion of the dopant is consumed in the reduction of the PTFE, the remaining reducing agent will function as a donor-dopant for the PA that is being formed.

In the third step of the process of the invention, a polymer is grafted to the doped-PA/PTFE substrate, resulting in a "sandwiched" substrate, or ternary (PTFE/PA/polymer) graft. Polymers capable of grafting to this substrate are those that can be contacted with the modified PTFE in precursor (monomeric) form and polymerized in situ with the PA on or in the surface of the substrate to form at least in part, a polymer graft.

Any monomer or other polymer precursor which is capable of polymerization will graft to the doped polyacetylene area of the substrate. Preferred are $\alpha, \beta$ unsaturated polymers. Illustrative of this group are styrene, acrylonitriles, methylmethacrylates, ethylene, propylene, isobutene, methacrylonitrile, acrylamides and $\alpha$-methylstyrene, and dienes such as butadiene, isoprene, 1-phenylbutadiene, and 2, 3-dinethylbutadiene.

Also useful are epoxides or aldylene oxides such as styrene oxide, ethylene oxide and propylene oxide, or cyclic amides (lactams) such as $\beta$-propiolactam, caprolactam, enantholactam and $\alpha$-butyrolactam; lactones, such as propriolactone, butyrolactone; oxazolines such as methyl oxazoline, ethyl oxazoline, butyl oxazoline, and the like; monoisocyanates such as methyl isocyanate, ethyl isocyanate, butyl isocynate, phenyl isocynate, and the like; as well as episulfides of which ethylene episulfide, and propylene episulfide are examples. Of those mentioned, polymer precursors selected from the group of $\alpha$, unsaturated olefins, dienes, epoxides, episulfides, and lactones are preferred, with $\alpha$, unsaturated olefins, dienes, and epoxides particularly preferred.

In situ polymerization of the above polymer precursor may be carried out by contacting the monomers with the modified and doped PTFE substrate using conventional polymerization techniques, as for example, those described in S. R. Sandler and W. Karo, "Polymer Syntheses", Vol. 1, Academic Press, New York, N.Y. 1974.

Contact of the PA/PTFE substrate to the precursor may be effected by any conventional means known to the art such as vacuum transfer techniques, vacuum distillation, immersion into liquid monomer, or contact with gaseous or vapor forms of the monomer.

The amount of polymer that may be chemically bonded to the PA in this manner is limited only by the doping level and amount of polyacetylene formed on the surface of the substrate. In some embodiments of the present invention, it is desirable to chemically bond about a 0.01 to about 10 m layer of polymer to the PA, preferably about 0.1 m to about a 5 m layer of polymer.

Reaction times may be varied to alter the thickness of the resulting polymer layer. If surface coatings about 0.01 $\mu$m to about 10 $\mu$m are desired, the in situ polymerization reaction time may range between a few minutes to several days.

Reaction temperatures may vary widely depending on several parameters, such as the method used to contact the PA/PTFE substrate with the polymer precursor, the thickness of the resulting grafted polymer layer desired, and the like. Particularly useful temperatures when using, for example, the vacuum distillation method, would normally range from about 0° C.–78° C.; more preferably about 10° C.–50° C.

Larger amounts of the polymer and other types of polymers may be added to the polymer graft by an optional fourth step in the procedure. After a "small amount" of polymer is formed on the surface of the substrate, the sandwiched substrate (ternary graft) may then be contacted with additional polymers formed separately. In this optional step, the additional polymer or polymers are bonded to the outer polymer layer using polymer bonding techniques available in the art such as melt-molding, solvent coating and the like.

By "small amount" is meant an amount of the graft polymer grafted to all or a part of the PA on or in the surface of the substrate to a thickness of at least about one molecular layer of graft polymer. In the preferred embodiments of this invention which includes the optional step, layer thicknesses range in size from about 0.1 m to about 10 m. Particularly useful are layers from about 1 $\mu$m to about 5 $\mu$m in thickness, as this insures that an adequate amount of polymer will be present to adhere to additional polymer.

Other polymers which can be bonded to the graft polymer in this optional step may vary widely. However, it is preferable that the additional polymer contacted to the ternary graft be of approximately the same "cohesive energy density" as the polymer bonded to the PTFE substrate. By "cohesive energy density" is meant the stablizing energy in condensed phases (see F. W. Billmeyer in "Textbook of Polymer Science", John Wiley & Sons, New York, N.Y. 1984). In general, cohesive energy density of the polymers must be such that their cohesive energy density ratios are about 0.7 to about 1.5, with about 0.7 to about 1.3 most preferred. The additional polymer may then be bonded through the use of techniques available in the art such as melt-molding, solvent casting and the like.

In this manner, a bonded PTFE-containing composite may be formed having one or more layers of these grafted and bonded polymers of varying thicknesses.

In general, composites of the present invention are useful in forming molded parts, with PTFE as one of the surfaces. An example of this would be to convert one surface of a PTFE film to PA. Then the PA/PTFE film is doped on the PA side, a desired monomer (e.g.: styrene) is graft polymerized onto the PA/PTFE substrate, and finally, a film of polymer (styrene) is melt-molded onto the grafted side of the PTFE/PA.

The present method offers advantages in that novel composites may be formed during the molding process, providing better adhesion between the layers with a process that requires less steps. An example of this would be a tubular article composed of a sleeve of PTFE bonded on the outside to a conventional polymer matrix. The lining composed of the PTFE would be chemically resistant, while the conventional matrix outside might offer other features, such as conductivity, antistatic features, mechanical strength, and so on.

Chemically bonded grafts provided by the present process also provide an alternative to fixing PTFE components onto diverse surfaces via mechanical means, such as fasteners or clamps, or through the use of adhesives or an intermediate fitting.

DESCRIPTION OF THE PREFERRED EMBODIMENTS

The FIGURE schematically demonstrates a preferred embodiment of this invention. In the first step of the preferred embodiment, a substrate which in this preferred embodiment is composed of PTFE (depicted in the topmost structure) is contacted with a suitable chemical reducing agent which in this preferred embodiment is a benzoin anion in a suitable solvent preferably dimethylsulfoxide to convert all or a portion of the PTFE polymer chains on or near the surface of the substrate to PA. As is apparent from the middle structure, in this preferred embodiment, the fluorine from the PTFE on or near the surface is eliminated from the PTFE and an unsaturation is introduced to form PA chains at the surface of the substrate covalently bonded to the PTFE chains from which they were derived, of at least about fourteen carbon atoms in length. The PA at the surface is doped with a suitable n-type dopant such as butyl lithium in an amount of at least about 1 mole % based on the total carbon atoms in the PA at the surface of the substrate to form the doped polymer (not depicted). The doped polymer is then reacted with a suitable monomer, such as ethylene oxide to form the graft polymer which is covalently bonded to the surface PA as depicted in the lower structure.

The following examples present certain embodiments of the present invention and are not to be construed as limitive thereof.

EXAMPLE I

A. PTFE Surface Modification.

Polytetrafluoroethylene (PTFE), 5 mil (125 m) thick film was soxhlet extracted with tetrahydrofuran (THF) overnight, then dried. The PTFE film was placed for 2 days at 50° C. into a solution containing 4.0 g potassium tert-butoxide (sublimed), 0.27 g benzoin (recrystallized 2X), and 40 mL of distilled dimethylsulfoxide (DMSO). The film was rinsed under an inert atmosphere 3X with THF, 3X with deaerated deionized H2O, 3X with THF, then dried. The film was now golden in color. Resonance Raman and photoacoustic FT-IR spectra of the converted surface showed that the modified surface was composed primarily of polyacetylene, $(CH)_x$. When deuterated DMSO was used, resonance Raman and IR spectroscopy showed that the surface layer was composed of deuterated polyacetylene $(CD)_x$. A cross section of the film showed that the polyacetylene layer was approx. 15 m thick.

B. Sodium or Potassium/Naphthalide Doping of the Polyacetylene Surface Layer on PTFE in Preparation to Graft.

On a vacuum line in an "H" tube, polyacetylene on polytetrafluoroethylene (PA/PTFE) film was exposed to a solution of potassium naphthalide in THF for 2 min. The solution was decanted and the film rinsed with THF three times. The film went from glossy golden to a dull blue-black color. Resonance Raman spectra showed the appearance of lines corresponding to that of donor-doped PA.

C. Polystyrene Graft.

Styrene monomer was vacuum distilled on to the sodium or potassium doped-PA/PTFE film and left overnight. The sample developed a viscous-looking film on the surface. After rinsing with THF, a net weight gain of 18% was observed corresponding to polystyrene grafted to the polyacetylene layer on PTFE. Resonance Raman spectra of the grafted sample showed that a surface layer of polystyrene was formed, by comparison with control samples of polystyrene prepared on pure doped polyacetylene. Surface tension measurements also showed a change in surface tension for the polystyrene grafted sample, compared with the surface tension of the ungrafted, PA/PTFE surface.

D. Polyethylene Oxide Graft.

A potassium doped-PA/PTFE film was exposed to 400 torr of ethylene oxide gas on vacuum line for 30 min. After rinsing the film with THF and vacuum drying, the film exhibited a weight gain of 9.6% corresponding to polyethylene oxide (PEO). Surface tension measurements on the grafted film's surface showed there was a large increase in surface tension as a result of the graft compared with the ungrafted, PA/PTFE film.

EXAMPLE II

A similar procedure as in Example I was used, except the solvent, DMSO, was replaced with diglyme. Both potassium t-butoxide and benzoin are very soluble in diglyme. The resulting surface of the modified PTFE was not golden in color, as contrasted to the polymer run in DMSO. The PTFE film's surface was lavender in color and exhibited no evidence of conversion to polyacetylene. Accordingly, diglyme is not a successful solvent in the method of the present invention.

EXAMPLE III

The same procedure was used as in Example I above, except in place of PTFE, a poly (chlorotrifluoroethylene) polymer film, 125 m thick, was used, which was obtained by Allied Corporation under the trade name Aclar ®. This compound differs chemically from PTFE in that one of every four fluorine atoms in PTFE is replaced by a chlorine atom. The transparent film turned black in color after treatment and remained black when exposed to air. The film showed no evidence of polyacetylene conversion by resonance Raman spectroscopy. Accordingly, the method of the present invention is specific for PTFE.

EXAMPLE IV

Onto the Polyethylene oxide grafted surface of the sample from Example ID. was cast a solution of polyethylene oxide from methylene chloride to give a grafted composite containing a thicker polyethylene oxide layer.

What is claimed is:

1. A method for forming a grafted composite comprising a substrate containing polytetrafluoroethylene having a polymer grafted thereto, which method comprises the steps of:

a. reducing all or a portion of the polytetrafluoroethylene at a surface of the substrate to polyacetylene;

b. doping said polyacetylene with a reductive (n-type) or oxidative (p-type) dopant: and c. contacting said doped polyacetylene with a polymerizable monomer precursor capable of polymerizing with said polyacetylene for a time sufficient to form a first polymer of said monomer bonded to the surface of said substrate.

2. The method of claim 1 which further comprises the step of:

d. contacting said first polymer bonded to said substrate with a second polymer wherein the ratio of the cohesive energy density ratio of the first polymer to the cohesive energy densities of the second polymer is from about 0.7 to about 1.5, for a time and at temperature sufficient to bond said second polymer to said first polymer, to form a composite.

3. The method of claim 1 wherein the surface of said PTFE is reduced in a solvent capable of donating protons.

4. The method of claim 3 wherein the solvent has a proton acid $pK_a$ value under process conditions of between about 20 and about 35.

5. The method of claim 4 wherein the solvent is dimethylsulfoxide.

6. The method of claim 1 wherein the surface of the PTFE is reduced chemically to polyacetylene.

7. The method of claim 6 wherein the reducing agent is benzoin dianion.

8. The method of claim 5 wherein all or a portion of the PTFE at the surface of the substrate is reduced electrochemically to polyacetylene.

9. The method of claim 8 wherein all or a portion of the PTFE at the surface of the substrate is reduced by subjecting said PTFE to a reductive potential of from about 0.5 V to about 1.5 V positive of lithium metal potential when $Li/Li+$ is taken as 0.0 V.

10. The method of claim 1 wherein the dopant in step b is a donor (n-type) dopant.

11. The method of claim 1 wherein the dopant in step b is an acceptor (p-type) dopant.

12. A grafted composite formed by the method of claim 1.

13. The grafted composite of claim 12 wherein said first polymer is selected from the group consisting of polypropylene, polyvinylchloride, and polyethylene oxide.

14. The method of claim 10 wherein the dopant used in step b is an alkyllithium reagent.

15. The method of claim 1 wherein the thickness of the PA formed on the PTFE surface is from about 1 μm to about 5 μm, and wherein said PA has a conjugation length of about 10 units or greater.

16. The method of claim 1 wherein steps a and b are conducted simultaneously.

* * * * *